(12) United States Patent
Chen et al.

(10) Patent No.: US 11,352,808 B2
(45) Date of Patent: Jun. 7, 2022

(54) ROOFTOP TENT AND RECEIVING APPARATUS THEREOF

(71) Applicant: Beijing Playdo Outdoor Products Co., Ltd., Beijing (CN)

(72) Inventors: Shuaiqi Chen, Beijing (CN); Changda Xu, Beijing (CN); Yingquan Chang, Beijing (CN); Min Zhao, Beijing (CN)

( * ) Notice: Subject to any disclaimer, the term of this patent is extended or adjusted under 35 U.S.C. 154(b) by 0 days.

(21) Appl. No.: 17/033,912

(22) Filed: Sep. 27, 2020

(65) Prior Publication Data

US 2022/0098893 A1    Mar. 31, 2022

(51) Int. Cl.
| | |
|---|---|
| *E04H 15/06* | (2006.01) |
| *E04H 15/20* | (2006.01) |
| *E04H 15/64* | (2006.01) |
| *B60P 3/34* | (2006.01) |
| *E04H 15/16* | (2006.01) |
| *B60P 3/38* | (2006.01) |

(52) U.S. Cl.
CPC .............. *E04H 15/06* (2013.01); *B60P 3/341* (2013.01); *B60P 3/38* (2013.01); *E04H 15/16* (2013.01); *E04H 15/20* (2013.01); *E04H 15/64* (2013.01); *E04H 2015/201* (2013.01); *E04H 2015/206* (2013.01); *E04H 2015/208* (2013.01)

(58) Field of Classification Search
CPC .............. E04H 15/20; E04H 2015/201; E04H 2015/206
See application file for complete search history.

(56) References Cited

U.S. PATENT DOCUMENTS

| | | | | | |
|---|---|---|---|---|---|
| 4,197,681 | A | * | 4/1980 | Holcombe | E04C 3/005 52/2.21 |
| 4,384,435 | A | * | 5/1983 | Polise | E04H 15/20 52/2.19 |
| 4,408,422 | A | * | 10/1983 | Bechtold | E04D 13/0305 52/200 |
| 4,766,628 | A | * | 8/1988 | Walker | A47C 27/082 137/232 |
| 5,007,212 | A | * | 4/1991 | Fritts | E04H 15/20 52/2.18 |
| 5,502,927 | A | * | 4/1996 | Hammerton | E04H 15/20 135/116 |
| 5,636,478 | A | * | 6/1997 | Chen | E04H 15/20 135/116 |

(Continued)

FOREIGN PATENT DOCUMENTS

| | | | |
|---|---|---|---|
| CN | 109356436 A | * | 2/2019 |
| CN | 111622582 A | * | 9/2020 |

(Continued)

*Primary Examiner* — David R Dunn
*Assistant Examiner* — Danielle Jackson (57) ABSTRACT

A rooftop tent includes a frame and a canopy, a first inlet is provided on the frame, and a side of the canopy is provided with an entrance; and a baseboard, which is inflatable and a second inlet in provided on a side of the baseboard. The frame is inflatable and air is inflated into the frame by the first inlet, such that the canopy is supported. A second inlet is located on the side of the baseboard, and the air is inflated into the baseboard through the second inlet, such that the baseboard is unfolded into a panel, which is used to support and carry the tent body. A receiving apparatus of the rooftop tent is also provided.

11 Claims, 7 Drawing Sheets

(56) References Cited

U.S. PATENT DOCUMENTS

| | | | | |
|---|---|---|---|---|
| 5,987,822 | A * | 11/1999 | McNiff | E04H 15/20 |
| | | | | 135/125 |
| 6,929,016 | B2 * | 8/2005 | Lee | E04H 15/20 |
| | | | | 135/126 |
| 9,624,688 | B1 * | 4/2017 | Tyson | B60P 3/39 |
| 10,208,502 | B2 * | 2/2019 | Currid | E04H 15/06 |
| 10,890,010 | B1 * | 1/2021 | Chang | E04H 15/324 |
| 11,059,414 | B2 * | 7/2021 | Dorn | E04H 15/06 |
| D935,378 | S * | 11/2021 | Chen | D12/403 |
| 2009/0249701 | A1 * | 10/2009 | Turcot | E04H 15/20 |
| | | | | 52/2.18 |

FOREIGN PATENT DOCUMENTS

| | | | | | |
|---|---|---|---|---|---|
| DE | 202004017570 | U1 * | 1/2005 | | E04H 15/08 |
| KR | 960009164 | Y1 * | 10/1996 | | |
| WO | WO-2014080391 | A * | 5/2014 | | E04H 15/20 |
| WO | WO-2016085183 | A1 * | 6/2016 | | E04H 15/20 |
| WO | WO-2017201555 | A1 * | 11/2017 | | E04H 15/20 |

* cited by examiner

ROOFTOP TENT AND RECEIVING APPARATUS THEREOF

TECHNICAL FIELD

The present disclosure relates to the field of vehicle rooftop tent, and particular to an inflatable rooftop tent.

BACKGROUND

With outdoor activities such as camping getting popular, more and more outdoor enthusiasts who choose to travel by car tend to choose to carry a rooftop tent to provide themselves with a comfortable resting place. However, a conventional rooftop tent can be large in size, heavy in weight, time-consuming and labor-intensive to install, and the number of models of cars that can be properly installed onto the roof is limited, which limits the range of choices for consumers and also brings users to use a lot of inconvenience. Furthermore, since the receiving space in a car is limited, a large-sized tent can occupy a lot of space, and can be inconvenient to carry with.

SUMMARY

In view of the shortcomings of the prior art described above, a rooftop tent and receiving apparatus thereof are provided, which have smaller size and lighter weight, and are suitable for various environments.

From one aspect, a rooftop tent is provided. The rooftop tent includes a frame and a canopy, a first inlet is provided on the frame, and a side of the canopy is provided with an entrance; and a baseboard, which is inflatable and a second inlet in provided on a side of the baseboard. The frame is inflatable and air is inflated into the frame via the first inlet, such that the canopy is supported.

In one of the embodiments, the frame includes a first connecting inflatable tube and a second connecting inflatable tube which are opposed provided, and a first supporting inflatable tube and a second supporting inflatable tube which are opposed provided. The first and the second connecting supporting tubes are connected via the first and the second connecting inflatable tubes, and the first and the second supporting inflatable tubes are both arc-shaped.

In one of the embodiments, two opposite sides of the baseboards are both provided with a first tie band, and the first and the second connecting inflatable tubes are fixed to the baseboard through the first tie bands.

In one of the embodiments, a first hook and loop fastener is provided on the first and the second supporting inflatable tubes, respectively. The canopy is fixed to the frame via the first hook and loop fastener.

In one of the embodiments, a second tie band is provided on a side of the canopy, and the side of the canopy is fixed to the side of the baseboard via the second tie band.

In one of the embodiments, a third connecting inflatable tube and a fourth connecting inflatable tube are separated provided between the opposite first supporting inflatable tube and the second supporting inflatable tube.

In one of the embodiments, a fixing band is provided on a bottom of the baseboard, the fixing band is double-cross shaped, a third tie band is detachably provided on the fixing band, and the third tie band is capable being fastened to a cross bar and a rack of a rooftop of a vehicle.

In one of the embodiments, the canopy is further has a back window and a skylight, two curtains are placed above the back window and the entrance, respectively. The curtains are fixed to the canopy by a second hook and loop fastener or a zipper, so as to cover the back window and the entrance.

In one of the embodiments, the rooftop tent also includes a skirt which is detachably surrounded around the bottom of the tent body.

In one of the embodiments, a plurality of rope hoops are provided outside of the tent body.

In one of the embodiments, the skylight includes a supporter, a gasket, and a window body.

In one of the embodiments, the first inlet and the second inlet both include a valve base, a valve spool, and a valve cap, respectively. The valve spool is in slidable and sealing engagement with the valve base, and the valve cap is detachable clamped to a top of the valve spool.

From another aspect, a receiving apparatus of the rooftop tent is provided. The receiving apparatus includes a box body, a ladder, and a caster wheel. The box body has a cavity to receive the rooftop tent, and an opening is defined on a side and a top of the box body, a handle is provided on the top of the box body, and a rectangular receiving groove is defined on the side of the box body. Moreover, a functional table board is received in the rectangular receiving groove, a side of the functional table board is hinged to a side of the rectangular receiving groove via a pivot, and a supporting leg is provided on the functional table board, and the supporting leg is telescopic.

According to the present disclosure, the technical solution is dividing the tent into two main parts, the tent body and the baseboard, and the two main parts are both inflatable. The inflatable baseboard is made of an excellent inflatable material, which is durable and pressure resistant. Therefore, it can be used in multiple locations and fields such as the rooftop of car, water, and ground, it is also suitable for use as a rescue boat under extreme conditions such as floods. Additionally, the double cross shaped fixing band on the bottom of the baseboard makes the tent can be adapted to more kinds of models of vehicle. When received, the tent can be compressed can rolled into the receiving apparatus, thereby achieving the effect of light weight and small size. The receiving apparatus can be used as a suitcase, which is easy to carry, and the problem of occupying large space is solved. Additionally, the functional table board on the side of the suitcase can be used as a table placing small items.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The present disclosure will be further described in detail below with reference to the drawings. A preferred embodiment is described in the drawings. However, the present disclosure can be implemented in many different forms and is not limited to the embodiments described herein. Rather, these embodiments are provided to provide a thorough understanding of the present disclosure.

It should be noted that when an element is referred to as being "fixed to" another element, it may be directly on the other element or there may be a centered element. When an element is referred to as being "connected to" another element, it may be directly on the other element or there may be a centered element.

Unless defined otherwise, all technical and scientific terms used herein have the same meaning as commonly understood by one of ordinary skill in the art of the field of the present disclosure. The terms used herein in the description of the present disclosure are only for the purpose of describing specific embodiments, and are not intended to limit the present disclosure.

Referring to FIG. 1 to FIG. 4, a rooftop tent 1 according to an embodiment of the present disclosure is in a using status being installed onto the top of the car 5. The rooftop tent 1 can be divided into two main parts, the tent body 10 and the baseboard 20. The tent body 10 includes a frame 11 and a canopy 12, and the frame 11 has a first inlet 13. The frame 11 is inflatable and air is inflated into the frame through the first inlet 13, such that the canopy 12 is supported by the frame 11. An entrance 16 is opened on the side of the canopy, such that the user can enter or go out of the rooftop tent 1. The rooftop tent 1 also includes an inflatable baseboard 20, a second inlet 24 is located on the side of the baseboard 20. When using, the air is inflated into the baseboard 20 through the second inlet 24, such that the baseboard 20 is unfolded into a panel, which is used to support and carry the tent body 10. The side of the baseboard 20 also includes first tie bands 21, and the side of the canopy 12 also includes second tie bands 14, the first tie bands 21 and the second tie bands 14 are used to fasten the tent body 10 onto the baseboard 20, thereby forming the entire rooftop tent 1.

A fixing band 22 is also located on the bottom of the baseboard, and the fixing band 22 is double-cross shaped. A third tie band 23 is detachably fastened to the fixing band 22. When the rooftop tent 1 is in the using status, the third tie band 23 is tightly fastened to the cross bar 52 and the rack 51 of the rooftop of the car 5, such that the baseboard 20 is fastened onto the rooftop of the car 5. Since the third tie band 23 is detachable, the relative location of the third tie band 23 with the double-cross shaped fixing band 22 can be arbitrarily adjusted. Therefore, the rooftop tent 1 can be adopted to any models of cars, without the limitation of the size of cars.

Referring to FIG. 1 to FIG. 4, the canopy 12 of the tent body 10 also has a back window 17 and a skylight 15, thereby ensuring the sufficient ventilation inside of the tent body 10. In order to prevent rainwater from entering the tent body 10 during rainy weather, two curtains 18 are both placed above the back window 17 and the entrance 16, respectively. The curtains 18 can be unfolded, and the unfolded curtains 18 are fixed to the tent body 10 by second hook and loop fasteners 121 located on the outer side of the canopy 12, so as to cover the back window 17 and the entrance 16. In one of the embodiments, a ventilation window 101 is also located above the entrance 16, so as to further improve the ventilation performance.

The curtain 18 can also to fixed to the tent body 10 by other methods and apparatus. For example, in another embodiment, zippers are provided around the back window 17 and the entrance 16, and the unfolded curtains 18 are fixed to the tent body 10 by the zippers, so as to cover the back window 17 and the entrance 16.

Figure 1:
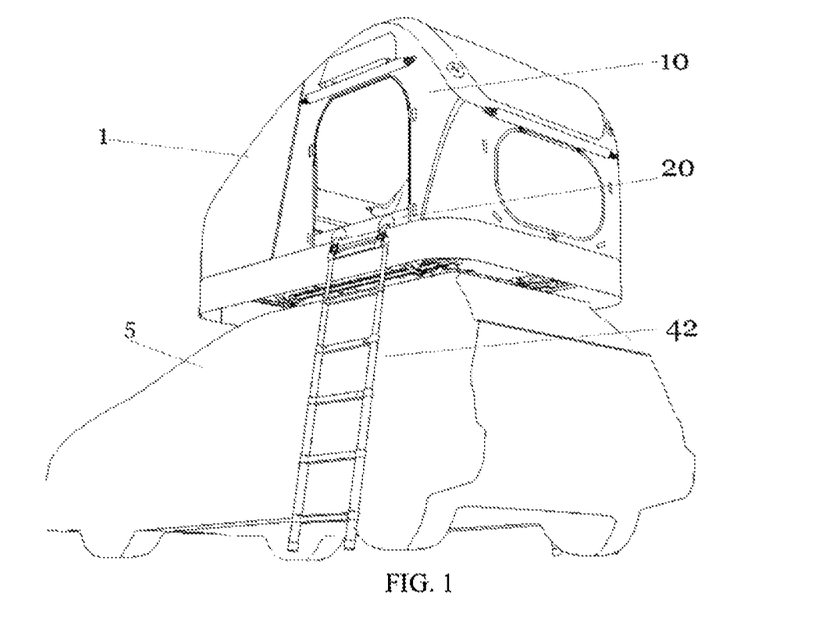
FIG. 1 is a perspective view of a rooftop tent according to an embodiment installed onto a car.
Figure 2:
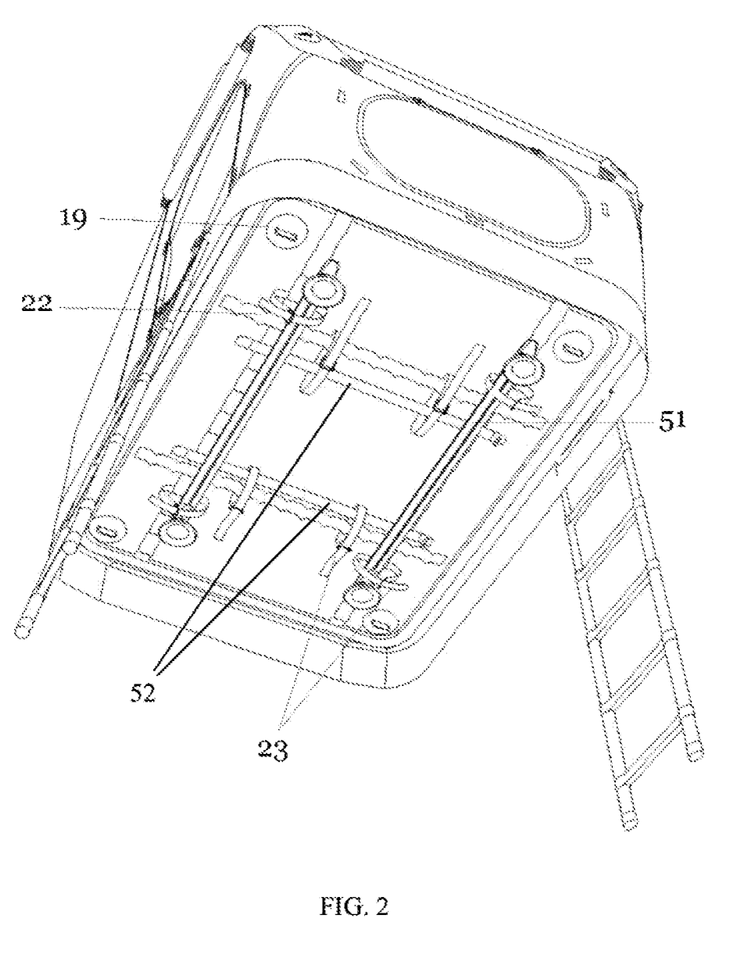
FIG. 2 is a perspective view of the rooftop tent of FIG. 1.
Figure 3:
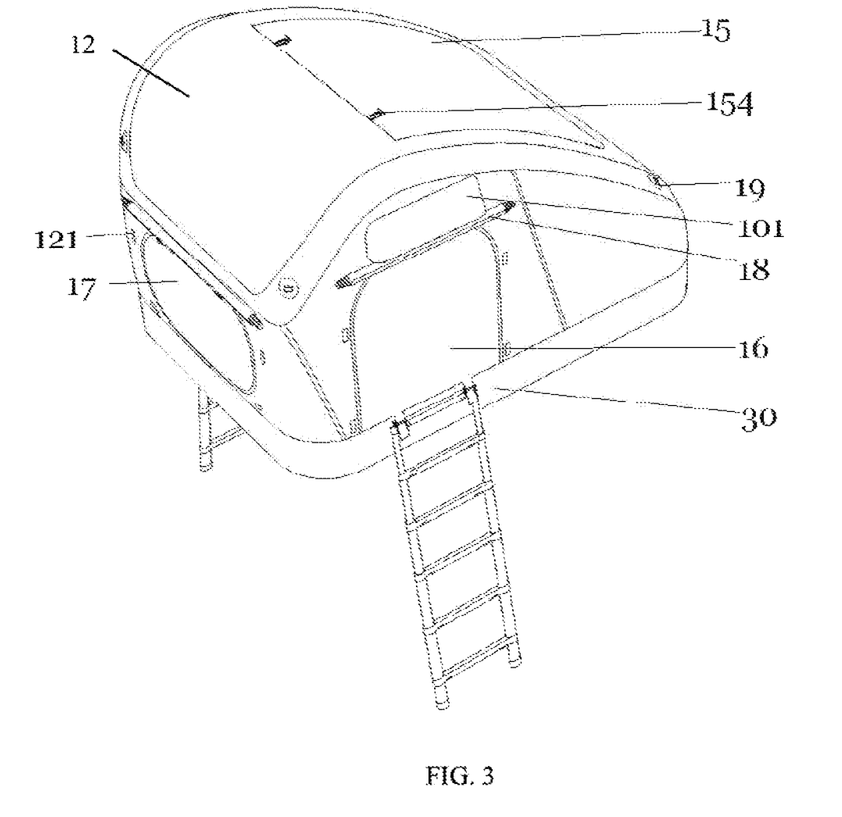
FIG. 3 is another perspective view of the rooftop tent of FIG. 1.
Figure 4:
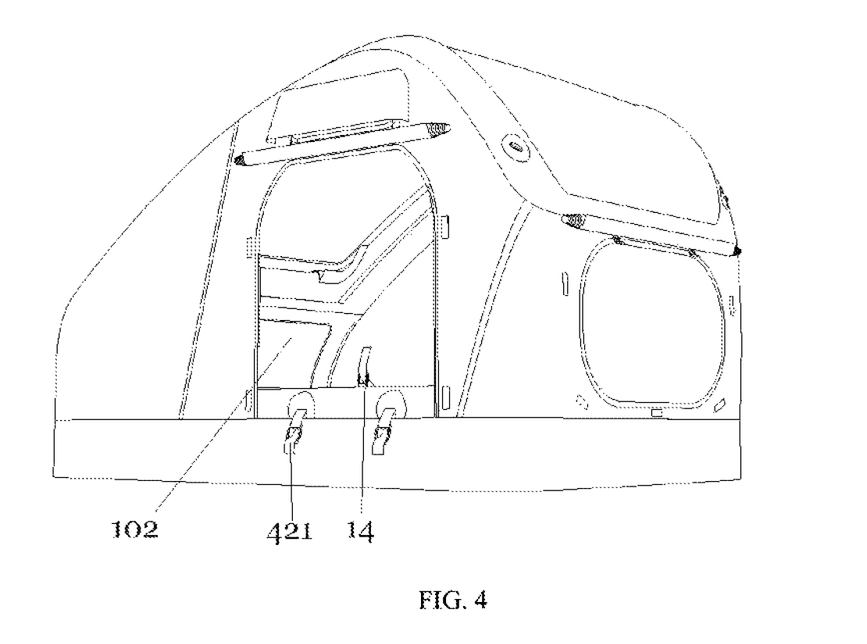
FIG. 4 is a perspective view of the tent body of the rooftop tent of FIG. 1.

Referring to FIG. 4, the tent body 10 also has a receiving bag 102 there inside, such that the user can receive items.

Additionally, the rooftop tent 1, further includes a skirt 30, and the skirt is detachably surrounded around the bottom of the tent body 10 while installed. The skirt 30 can be fixed by hook and loop fasteners, zippers, tie bands, or other common technical means.

Additionally, a plurality of rope hoops 19 are located outside of the tent body 10 and the bottom of the baseboard 20, so as to fix the rope (not shown) while installed, thereby enhancing the stability of the rooftop tent 1 in windy weather. The side of the baseboard 20 also has a tie band 421 for ladder, which can be used to fastening a ladder or other structures, facilitating the users entering the rooftop tent 1.

Figure 5:
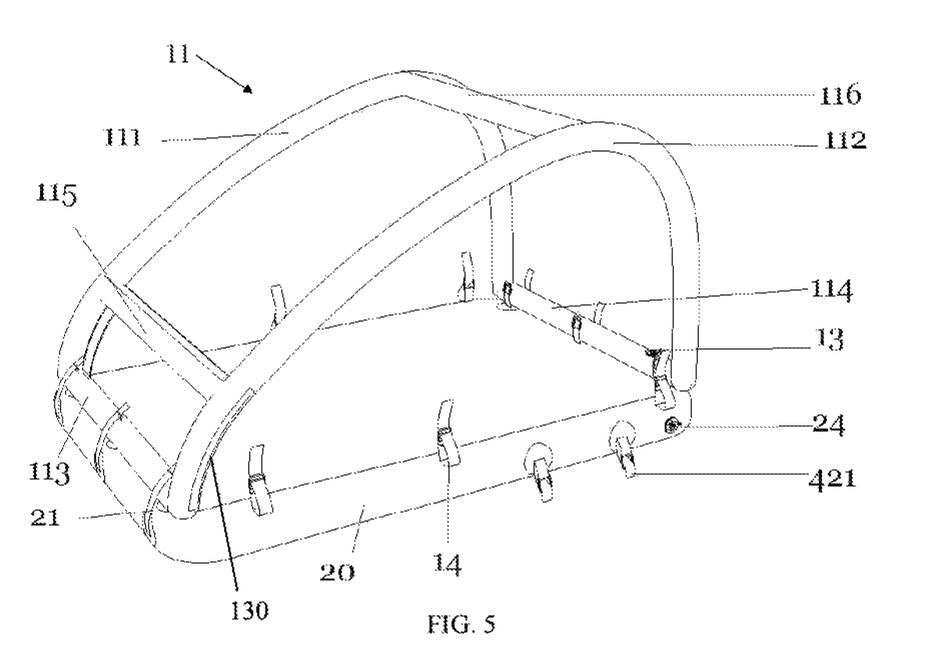
FIG. 5 is a perspective view of the connection between the frame and the baseboard of the rooftop tent of FIG. 1.

Additionally, FIG. 5 shows the structures of the tent body 10 and the frame 11, and the detailed connection between the baseboard 20 and the tent body 10. In the illustrated embodiment, the frame 11 at least includes a first connecting inflatable tube 113 and a second connecting inflatable tube 114 which are opposed provided, and a first supporting inflatable tube 111 and a second supporting inflatable tube 112 which are also opposed provided. The first and the second connecting supporting tubes 111 and 112 are connected via the first and the second connecting inflatable tubes 113 and 114, forming an inflatable structure which is internally connected therein. Also, and the first and the second supporting inflatable tubes 111 and 112 are both arc-shaped, therefore, the user can inflate the frame 11 through the first inlet 13, such that the first and the second supporting inflatable tubes 111 and 112 are risen, thereby unfolding and supporting the canopy 12. Due to the arc shape of the first and the second supporting tubes 111 and 112, the number of connecting seams between the inflatable tubes of frame 11 is greatly minimized, so as to extend the service life of the frame 11 with the supporting function of the frame 11 being ensured. Additionally, a third connecting inflatable tube 115 and a fourth connecting inflatable tube 116 are separated provided between the opposite first supporting inflatable tube 111 and the second supporting inflatable tube 112, so as to prevent the frame 11 from deformation. Also, first hook and loop fasteners 130 are provided on the first and the second supporting inflatable tubes 111 and 112.

Therefore, during installing the rooftop tent 1, the air is inflated into the frame 11 through the first inlet 13, such that the first supporting inflatable tube 111 and the second supporting inflatable tube 112 are risen, and the air is inflated into the baseboard 20 through the second inlet 24, such that the baseboard 20 is unfolded into a panel. The first tie bands 21 on the side of the baseboard 20 surround and are fixedly tied to the first and the second connecting inflatable tubes 113 and 114, so as to fix the frame 11 onto the baseboard 20. Then, the canopy 12 is attached to the frame 11 by the first hook and loop fastener 130, forming the tent body 10. The second tie band 14 on the tent body 10 fixes the side of the tent body 10 onto the baseboard 20. Finally, the third tie band 23 is tightly fastened to the cross bar 52 and the rack 51 of the rooftop of the car 5, such that the baseboard 20 is fastened onto the rooftop of the car 5.

Figure 6:
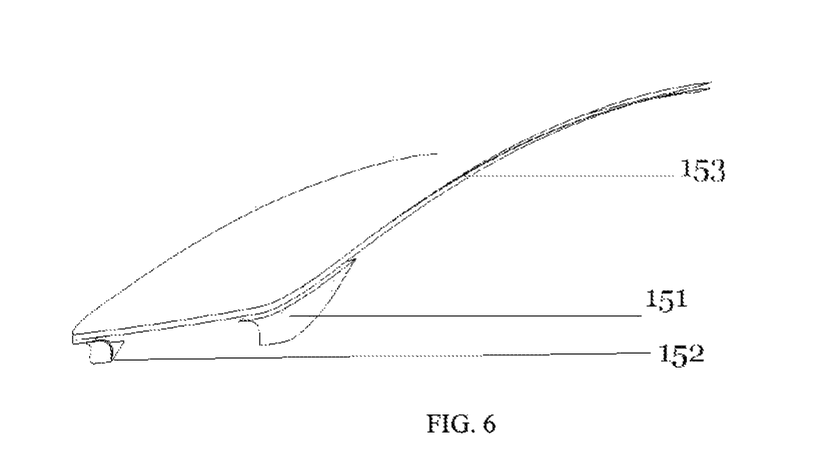
FIG. 6 is a side view of the skylight of the rooftop tent of FIG. 1.

Referring to FIG. 6, in one of the embodiments, the skylight 15 includes a supporter 151, a gasket 152, and a window body 153. The window body 153 can be fixed to the canopy 12 by the bottom 154. When the skylight 153 is not opened, the window body 153 is in the same height with the top of the canopy 12. When the skylight 153 is opened, the window body 153 is raised by the supporter 151, and the supporter 151 is fixed by the gasket 152, such that the window body 153 stays higher than the top of the canopy 12, so as to ventilate.

Figure 7:
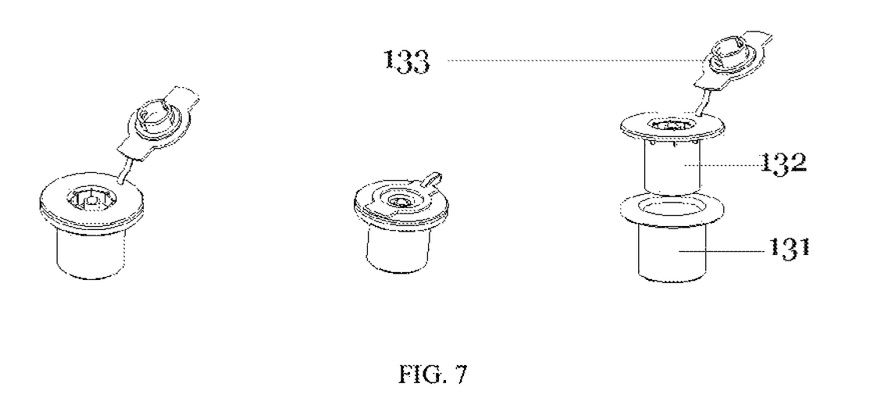
FIG. 7 is a perspective view of the inlet of the rooftop tent of FIG. 1.

Referring to FIG. 7, in the illustrated embodiment, the first inlet 13 includes a valve base 131, a valve spool 132, and a valve cap 132. The valve spool 132 is in slidable and sealing engagement with the valve base 131, and the valve cap 133 is detachable clamped to a top of the valve spool 132. During inflating the frame 11, the valve cap 133 is opened, a tool such as a gas pump is used to inflate the air through the valve spool 132. When the frame 11 is inflated, the valve cap 133 is re-closed and clamped to the top of the valve spool 132, ensuring the airtight effect. Since the second inlet 24 on the side of the baseboard 20 has the same structure as the first inlet 13, it is not shown in additional drawings.

Figure 8:
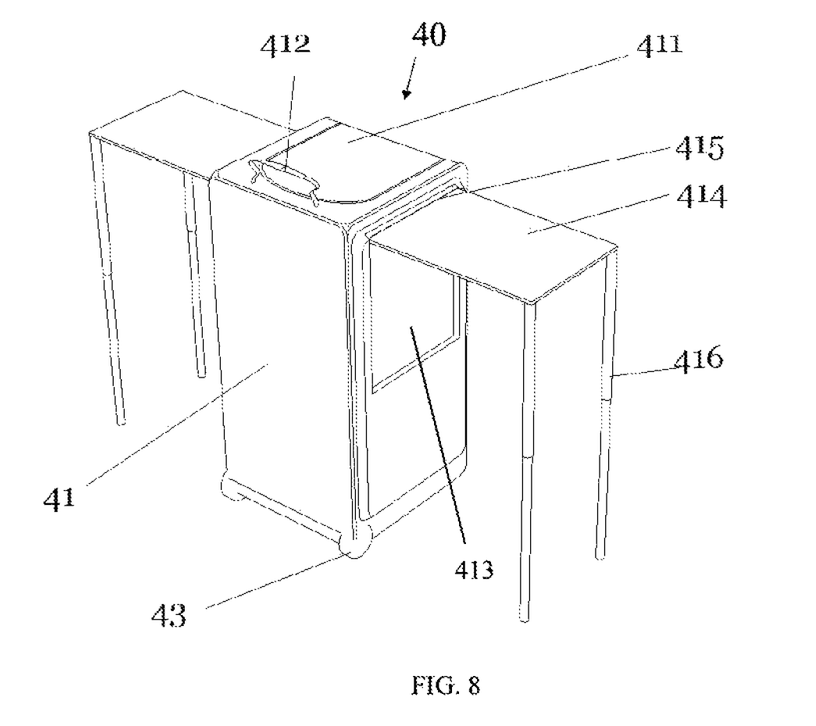
FIG. 8 is a perspective view of a receiving apparatus of a rooftop tent according to an embodiment.
Figure 9:
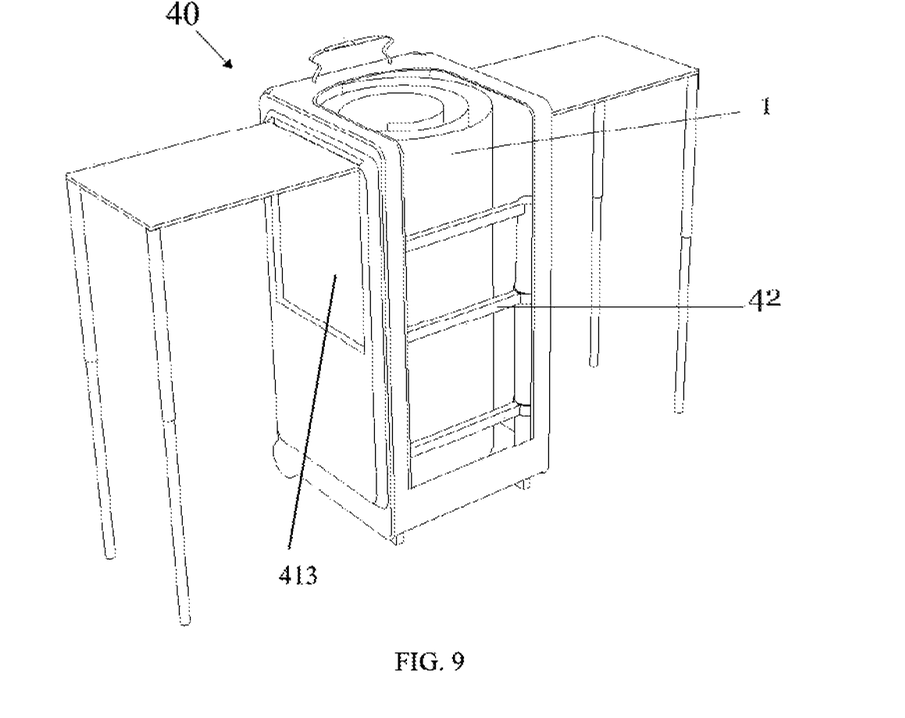
FIG. 9 is another perspective view of the receiving apparatus of FIG. 1.

Referring to FIG. 8 and FIG. 9, the present disclosure also provides a receiving apparatus 40 of the rooftop tent 1. The receiving apparatus 40 includes a box body 41, a ladder 42, and a caster wheel 43. The box body 41 has a cavity to receive the rooftop tent 1, and an opening 411 is defined on a side and a top of the box body 41, a handle 412 is provided on the top of the box body 41, and a rectangular receiving groove 413 is defined on the side of the box body 41. The receiving apparatus 40 further includes a ladder 42, which is received in the cavity, and the ladder 42 is telescopic. The caster wheel 43 is located on the bottom of the box body 41. Moreover, a functional table board 414 is received in the rectangular receiving groove 413, the side of the functional table board 414 is hinged to the side of the rectangular receiving groove 413 by a pivot 415, the functional table board 414 has a supporting leg 416 which is telescopic.

Figure 10:
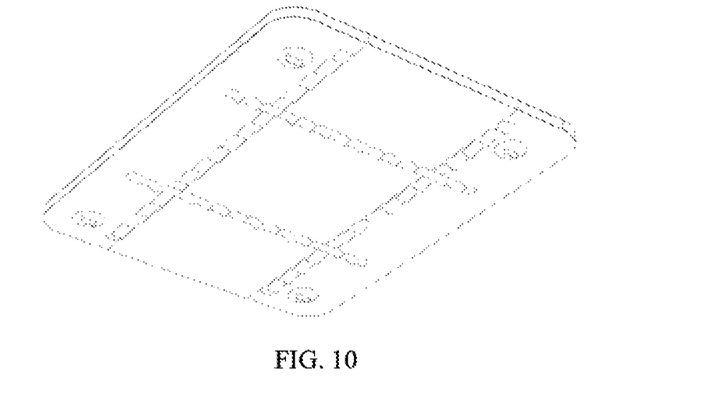
FIG. 10 is a perspective view of the baseboard of the rooftop tent of FIG. 1 when deflated.

As shown in FIG. 7 and FIG. 8, when the rooftop tent 1 is required to be received, the canopy 12 can be detached from the frame 11, and the frame 11 and the baseboard 20 can be deflated. The deflated baseboard 20 (as shown in FIG. 10) can be rolled as a roll, and the frame 11 and the canopy 12 can be received in the roll, such that the baseboard 20, the frame 11, and the canopy 12 can all be received in the receiving apparatus 40.

The receiving apparatus 40 can also be used as a suitcase, such that the rooftop tent 1 can be received and carried conveniently. Additionally, since the side of the functional table board 414 is hinged to the side of the rectangular receiving groove 413 by the pivot 415, the functional table board 414 can rotate around the pivot 415, and while the functional table board 414 is rotated to a horizontal position, the supporting leg 416 can be unfolded until the end of the supporting leg 416 touches the ground, thereby a simple table is formed. Thus, the present disclosure not only improves the convenience of users when traveling, but also reduces the amount of luggage that needs to be carried.

According to the embodiments of the present disclosure, since the body and the baseboard of the rooftop tent are both inflatable, which are easy to be received and folded, such that the entire size and weight of the product are reduced and the rooftop tent can be more convenient to be received. Additionally, since the third tie band is detachably fastened to the double-cross shaped fixing band, the relative location of the third tie band with the double-cross shaped fixing ban can be arbitrarily adjusted. Therefore, the rooftop tent can be adopted to any models of cars, without the limitation of the size of cars, thereby increasing the adaptability of the rooftop tent. Since the baseboard inflatable, the present disclosure can be used in multiple locations and fields such as the rooftop of car, water, and ground, it is also suitable for use as a rescue boat under extreme conditions such as floods, thereby enlarging the use range of the rooftop tent. Also, the receiving apparatus which can be used as a suitcase not only increase the convenience of the rooftop tent, since the functional table board can be supported as a table for placing item, which also improves the convenience of users when traveling.

The technical features of the embodiments described above can be arbitrarily combined. In order to simplify the description, not all possible combinations of the technical features in the above embodiments have been described. However, as long as there is no contradiction in the combination of these technical features, it should be considered to be within the scope of the present disclosure.

The specific embodiments are only explanations of the present disclosure, and the embodiments are not intended to limit the present disclosure. Rather, various modifications may be made in the details within the scope and range of equivalents of the claims and without departing from the present disclosure. The scope of this present disclosure is not limited to the content of the description, and its technical scope shall be determined according to the scope of the claims. Such that the protection scope of the present disclosure should be subject to the claims.

What is claimed is:

1. A rooftop tent, comprising:
   a tent body, comprising a frame and a canopy, wherein a first inlet is defined on the frame, and a side of the canopy is provided with an entrance; and
   a baseboard, wherein the baseboard is inflatable and a second inlet in defined on a side of the baseboard; wherein the frame is inflatable and air is inflated into the frame via the first inlet, such that the canopy is supported;
   a fixing band is provided on a bottom of the baseboard, the fixing band is double-cross shaped; a third tie band is detachably provided on the fixing band to fasten the fixing band to a cross bar and a rack of a rooftop of a vehicle; a relative location of the third tie band with the fixing band is adjustable;
   the canopy is provided with a skylight; the skylight comprises a supporter, a gasket, and a window body; the supporter is fixed by the gasket, when the skylight is opened, the window body is raised by the supporter, such that the window body stays higher than a top of the canopy, so as to ventilate the rooftop tent.

2. The rooftop tent according to claim 1, wherein the frame comprises a first connecting inflatable tube and a second connecting inflatable tube which are oppositely provided, and a first supporting inflatable tube and a second supporting inflatable tube which are oppositely provided, the first and the second supporting inflatable tubes are connected via the first and the second connecting inflatable tubes, and the first and the second supporting inflatable tubes are both arc-shaped.

3. The rooftop tent according to claim 2, wherein two opposite sides of the baseboard are provided with a first tie band, respectively, and the first and the second connecting inflatable tubes are fixed to the baseboard via the first tie bands.

4. The rooftop tent according to claim 2, wherein a first hook and loop fastener is provided on the first and the second supporting inflatable tubes, respectively, and the canopy is fixed to the frame via the first hook and loop fastener.

5. The rooftop tent according to claim 2, wherein a second tie band is provided on a side of the canopy, and the side of the canopy is fixed to the side of the baseboard via the second tie band.

6. The rooftop tent according to claim 2, wherein a third connecting inflatable tube and a fourth connecting inflatable tube are separately provided between the first supporting inflatable tube and the second supporting inflatable tube.

7. The rooftop tent according to claim 1, wherein the canopy is further defined with a back window, two curtains are provided above the back window and the entrance, respectively, and the curtains are fixed to the canopy via a second hook and loop fastener or a zipper, so as to cover the back window and the entrance.

8. The rooftop tent according to claim 1, further comprising a skirt, wherein the skirt is detachably surrounded around a bottom of the tent body.

9. The rooftop tent according to claim 1, wherein a plurality of rope hoops are provided outside of the tent body.

10. The rooftop tent according to claim 1, wherein the first inlet and the second inlet both comprise a valve base, a valve spool, and a valve cap, respectively, the valve spool is in slidable and sealing engagement with the valve base, and the valve cap is detachable clamped to a top of the valve spool.

11. The rooftop tent according to claim 1, wherein the fixing band comprises a plurality of fixing loops; the third tie band fastens the fixing band to the cross bar and the rack of the rooftop of the vehicle through the plurality of fixing loops.

* * * * *